W. J. MORGAN.
Combined Land-Rollers and Harrows.
No. 149,776. Patented April 14, 1874.
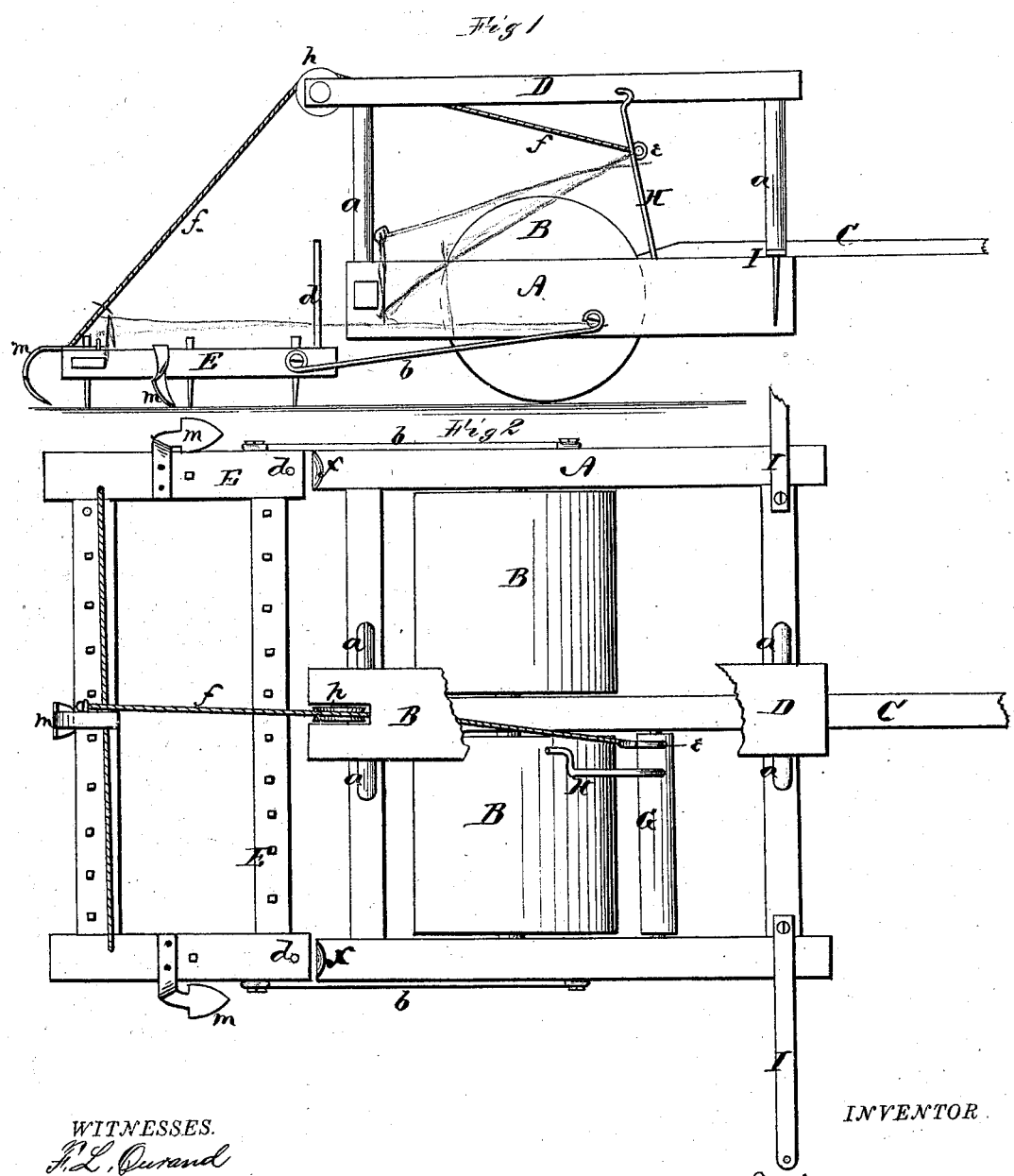
WITNESSES.
INVENTOR.

UNITED STATES PATENT OFFICE.

WILLIAM J. MORGAN, OF HIGHLAND, OHIO.

IMPROVEMENT IN COMBINED LAND-ROLLERS AND HARROWS.

Specification forming part of Letters Patent No. 149,776, dated April 14, 1874; application filed February 13, 1874.

*To all whom it may concern:*

Be it known that I, WILLIAM J. MORGAN, of Highland, in the county of Highland and in the State of Ohio, have invented certain new and useful Improvements in Combined Land-Roller, Marker, and Harrow; and do hereby declare that the following is a full, clear, and exact description thereof, reference being had to the accompanying drawings and to the letters of reference marked thereon, making a part of this specification.

The nature of my invention consists in the construction and arrangement of a combined land-roller, harrow, and marker, as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a plan view, of my machine.

A represents a rectangular frame, of any suitable dimensions, in which are placed and revolve two rollers, B B, constructed in any of the known and usual ways. C represents the tongue attached to the center of the frame A, between the rollers B B, as shown. D represents the driver's seat, made in the form of a bench supported from the frame A by posts or rods $a$ $a$, and located above the inner ends of the rollers B B. E represents the harrow, connected by means of rods $b$ $b$ to the roller-frame A. These rods are pivoted one to each side piece of the harrow near the front end, and the front end of each rod pivoted to the side of the roller-frame at or near the center thereof. At the front end of the harrow, near each side, is attached a vertical upward extending-rod, $d$. In the front part of the roller-frame A, on one side of the seat D, is a rock-shaft, G, provided with a lever, H, to be operated by the driver either with the hand or foot. On the rock-shaft G is an arm, $e$, from which a cord or chain, $f$, passes over a pulley, $h$, mounted in a slot in the rear end of the seat or bench D, and the cord or chain then attached to the rear part of the harrow E. By pressing the lever H forward, the cord or chain $f$ will pull the rear part of the harrow upward, and the rods $d$ $d$ at the front end thereof will strike on or come in contact with the rear ends of the side pieces of the roller-frame A, which are notched or hollowed out for that purpose, as shown at $x$ in Fig. 2, thereby raising the front end of the harrow also, and holding the whole harrow up from the ground. To the harrow-frame are secured cultivator-teeth $m$ $m$, so that the machine can be used as a cultivator, if desired. On top of the roller-frame A, at each side, is pivoted a marker, I, to be used in marking off the ground.

The advantages of this construction of the machine are principally as follows: Raising the harrow by lever-power, so as to free it from all collections or incumbrances at once, which is done with great ease to the driver, without stopping the team, by means of applying the foot or hand, at will. In cultivating small corn it is very speedy, and does the work complete. The horses walk each in his row, the center of the roller-frame being over the hill, the rollers pulverizing all the clods, and the harrow following and cultivating the ground very near the corn without disturbing it.

Marking off the rows of corn is done at the same time of going over the land the second time, the rows being precisely the same distance apart and perfectly straight, if the first one is made straight.

The harrow may be detached and used separately, if so desired.

Having thus fully described my invention, what I claim as new, and desire to secure by Letters Patent, is—

The combination of the frame A, rollers B B, harrow E, connecting-rods $b$ $b$ pivoted to the frames A and E, vertical rods $d$ $d$, rock-shaft G, lever H, rod $e$, and cord $f$, all substantially as and for the purposes herein set forth.

In testimony that I claim the foregoing I have hereunto set my hand this 24th day of January, 1874.

WILLIAM J. MORGAN.

Witnesses:
CHARLES CLARKE,
LEONARD PENSYL.